(12) United States Patent
Kojima et al.

(10) Patent No.: US 7,251,928 B2
(45) Date of Patent: Aug. 7, 2007

(54) PULSE DETONATION ENGINE AND VALVE

(75) Inventors: Takayuki Kojima, Tokyo (JP); Tetsuya Sato, Tokyo (JP); Hiroaki Kobayashi, Tokyo (JP)

(73) Assignee: Japanese Aerospace Exploration Agency, Chofu-shi (JP)

( * ) Notice: Subject to any disclaimer, the term of this patent is extended or adjusted under 35 U.S.C. 154(b) by 252 days.

(21) Appl. No.: 11/061,546

(22) Filed: Feb. 18, 2005

(65) Prior Publication Data

US 2005/0183413 A1 Aug. 25, 2005

(30) Foreign Application Priority Data

Feb. 19, 2004 (JP) ............................ 2004-042735

(51) Int. Cl.
*F02K 7/06* (2006.01)
*F02K 7/20* (2006.01)

(52) U.S. Cl. ...................... 60/247; 60/39.39; 60/39.78; 60/767

(58) Field of Classification Search ............... 60/39.38, 60/39.39, 39.4, 39.76, 39.78, 247, 767, 768
See application file for complete search history.

(56) References Cited

U.S. PATENT DOCUMENTS 2,942,412 A * 6/1960 Bollay ......................... 60/247

| | | | |
|---|---|---|---|
| 5,353,588 A | 10/1994 | Richard | |
| 5,473,885 A | 12/1995 | Hunter, Jr. et al. | |
| 5,513,489 A * | 5/1996 | Bussing | 60/39.39 |
| 6,526,936 B2 * | 3/2003 | Nalim | 123/213 |
| 6,637,187 B2 * | 10/2003 | Sanders et al. | 60/39.39 |

FOREIGN PATENT DOCUMENTS

JP 2001-355515 12/2001

OTHER PUBLICATIONS

Detonation—The Battle for the Next Generation Engine Popular Science Magazine, Nov. 2003.
T.R.A. Bussing, "A Rotary Valve Multiple Pulse Detonation Engine" AIAA-95-2577.

* cited by examiner

*Primary Examiner*—L. J. Casaregola
(74) *Attorney, Agent, or Firm*—Westerman, Hattori, Daniels & Adrian, LLP.

(57) ABSTRACT

Pressure and density of a gaseous mixture are increased in the process of introducing the gaseous mixture into the combustor of an air-breathing pulse detonation engine employing atmospheric oxygen as an oxidizer. The exit valve 20 able to be opened and closed is provided at the outlet of the combustor 15, an air cooler 12 is provided in the exit of the intake, and density is increased by exchange of heat of the air received at the intake with a coolant in the air cooler 12. Furthermore, by closing the exit valve 20 provided in the outlet of the combustor during the process of loading the gaseous mixture, transition to the detonation process is possible without expansion of the high-pressure high density air obtained by ram-compression at the intake.

6 Claims, 4 Drawing Sheets

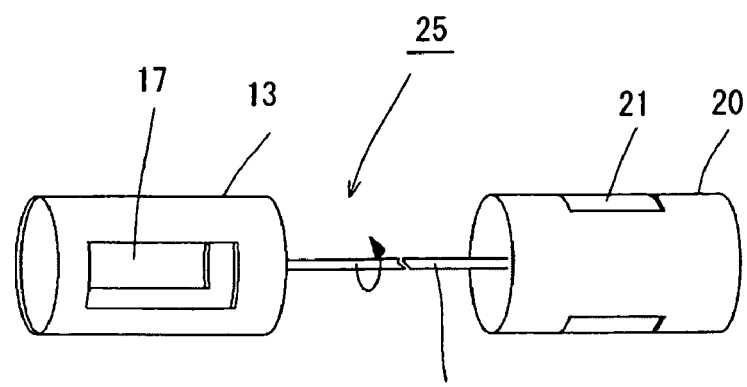
Fig. 3A
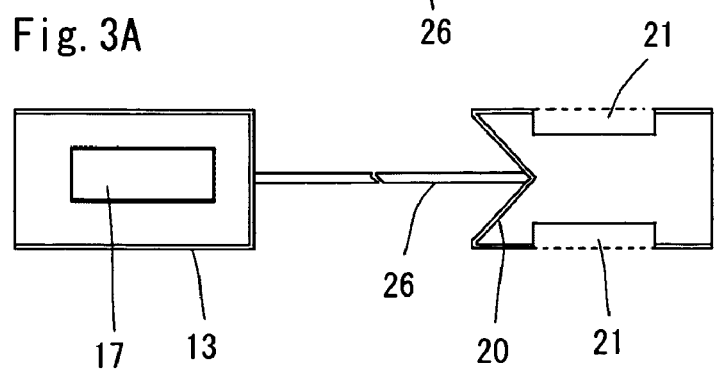
Fig. 3B
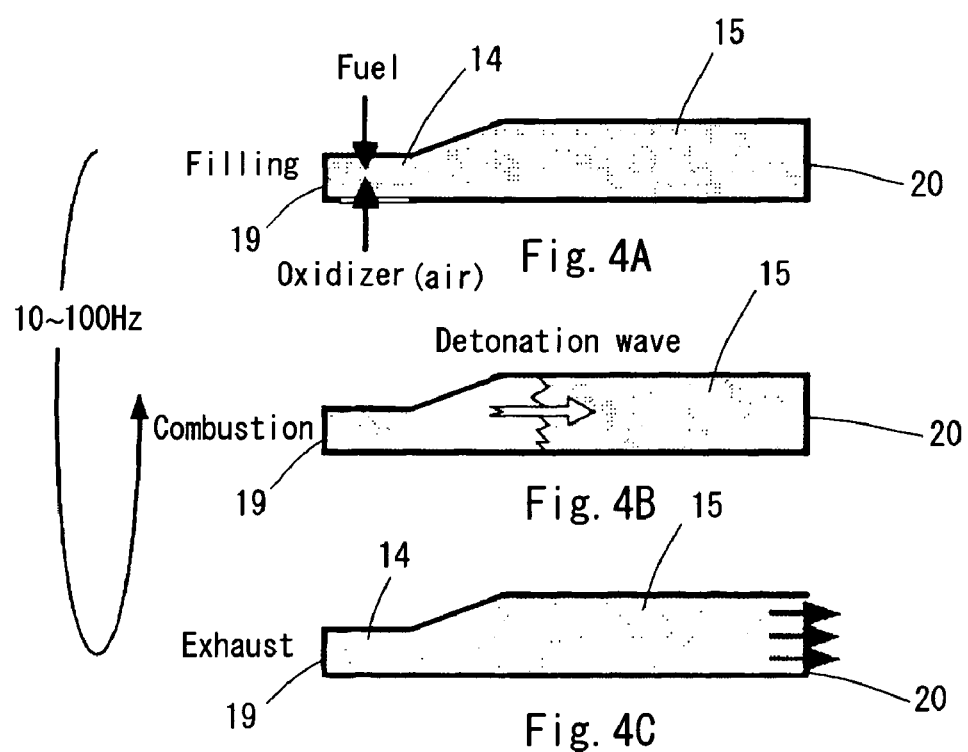
Fig. 4A
Fig. 4B
Fig. 4C

Prior Art
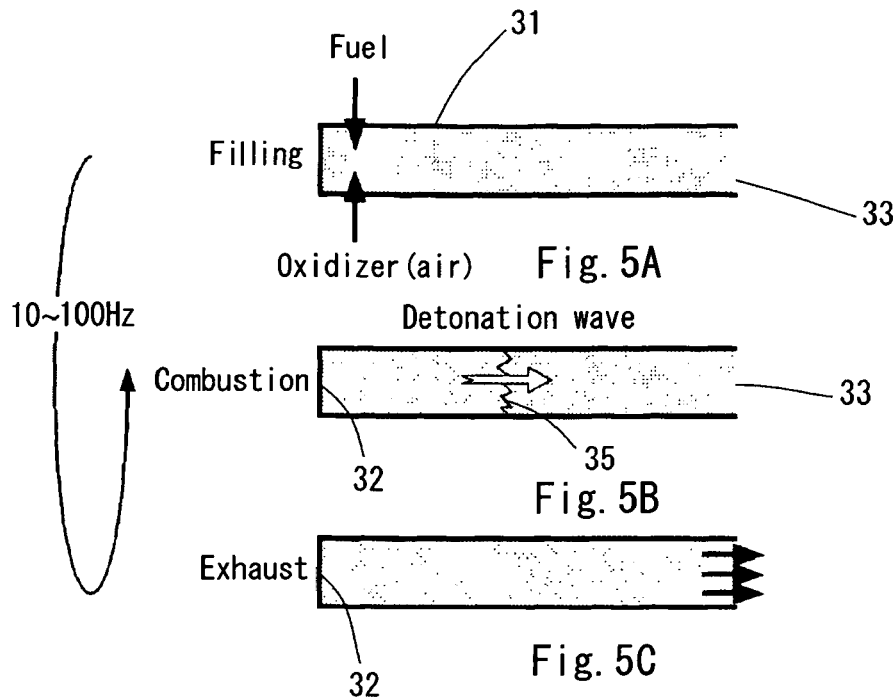
Fig. 5A
Fig. 5B
Fig. 5C
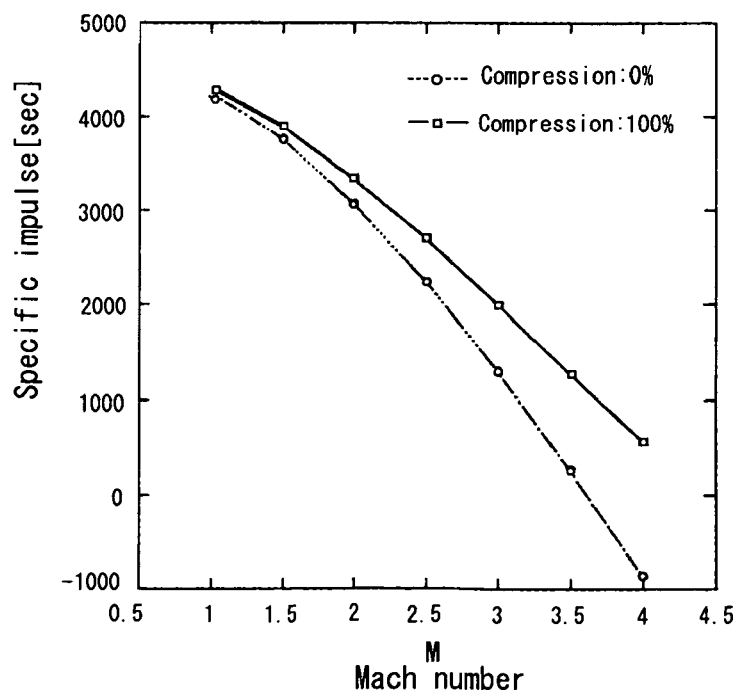
Fig. 6

PULSE DETONATION ENGINE AND VALVE

BACKGROUND OF THE INVENTION

1. Field of the Invention

The present invention relates to a pulse detonation engine for possible application as a propulsion engine for a spaceplane, high-speed aircraft, or launch rocket and the like, and more particularly to a pulse detonation ramjet engine suitable as an engine required for operation at flight speeds from takeoff to hypersonic, and a valve employed therein.

2. Description of the Related Art

The detonation phenomenon is a supersonic combustion phenomenon accompanied by a vertical shockwave at the front face of the combustion wave, and has a greater produced energy density than normal subsonic combustion (deflagnation), and generates a combustion gas of higher temperature and pressure. Research into the control and effective use of this [detonation phenomenon] has been conducted (see Popular Science Magazine, November 2003 "Detonation—The Battle for the Next Generation Engine", and AIAA-95-2577 "A Rotary Valve Multiple Pulse Detonation Engine (RVMPDE)) in recent years in association with clarification of detonation wave cell structures and transition conditions and timing and the like for deflagnation detonation. The pulse detonation engine is an engine where detonation is employed in the combustion process, and, as shown schematically in FIGS. 5A through 5C, is an intermittent combustion engine where a gaseous mixture of fuel and oxidizer is repeatedly introduced into, combusted in, and exhausted from, a combustor (combustion tube) 31 at a frequency of between 10 Hz and 100 Hz. In the process of filling the gaseous mixture, the gaseous mixture is supplied into the combustor 31, ignited at the closed end 32 of the combustor, and the combustion wave transformed from a deflagnation wave to a detonation wave during propagation from the closed end to the open end 33. Once a detonation wave 35 is formed, the high temperature and high-pressure combustion gas generated by combustion generates a large thrust at the closed end 32. When the detonation wave 35 reaches the open end 33 and the exhaust process commences, combustion gas is exhausted until the pressure of the open end 33 is equal with the external air pressure.

As an example of a pulse detonation engine employing such a detonation phenomenon, an engine combining a turbofan jet engine with a pulse detonation engine has been proposed (see Japanese Patent Application Laid-open No. 2001-355515) as a pulse detonation engine operating over a wide range of flight speeds. Furthermore, since the pulse detonation engine is, as described above, an intermittent combustion engine, in order to generate thrust continuously with sequential operation in an effective cycle using a plurality of combustors, combustor inlet valves supplying and controlling the gaseous mixture to the combustors are required to open and close rapidly with precise timing. A pulse detonation engine provided with a rotary disk valve has been proposed to satisfy this requirement (see for example, U.S. Pat. No. 5,353,588, and U.S. Pat. No. 5,473,885).

Previously proposed pulse detonation engines provide an opening and closing valve in the combustor inlet for supply and control of the gaseous mixture to permit the cycle of filling with the gaseous mixture, its combustion and exhaust, however the outlet of the combustor communicates directly with the nozzle and is always open to atmosphere. Thus, since the combustor is not isolated from the external atmosphere in the gaseous mixture filling process, the filling pressure and density are slightly greater than that of the external air. Thrust density of the combustor (=produced thrust÷combustor cross-sectional area) is therefore restricted by external air pressure, and is reduced as flight altitude increases. For this reason, pulse detonation engines are considered unsuitable as supersonic air-breathing engines at high altitude, and the advantages of high specific impulse are not obtained. Furthermore, since pulse detonation engines repeat combustion rapidly as described above, rapid opening and closing of the inlet valve supplying the gaseous mixture to the combustor is required, and they are subject to the problem of ready fatigue break due to vibration and repetitive stress resulting from combustion.

SUMMARY OF THE INVENTION

An object of the present invention is to provide an engine employing pulse detonation in the primary combustion process wherein pressure and density are increased in the process of introducing the gaseous mixture into the combustor in an air-breathing pulse detonation engine employing atmospheric oxygen as the oxidizer, thus permitting high thrust density even in supersonic air-breathing engines at high altitude, and more particularly to provide a pulse detonation ramjet engine.

A further object of the present invention is to provide a valve for a pulse detonation engine having superior rapid opening and closing performance, and improved proof against fatigue break due to vibration and repetitive stress resulting from combustion, while pressure and density are increased in the process of filling the combustor with the gaseous mixture, and permitting high thrust density even in supersonic air-breathing engines at high altitude.

As a result of a variety of study in order to increase the thrust density of the pulse detonation engine at high altitude, the inventors have contrived that the transition to the detonation process can be achieved by intermittent blocking of the combustor outlet during the process of filling with the gaseous mixture, and increasing the pressure and density of the operating fluid without expansion by cooling high-pressure air received as oxidizer, and have thus arrived at the present invention.

In other words, the pulse detonation engine of the present invention resolving the afore-mentioned problems is a pulse detonation engine for detonating a gaseous mixture of an oxidizer and a fuel in a combustor to obtain thrust, comprising: a supply valve able to open and close provided in the inlet of the combustor; and an exit valve able to open and close provided in the outlet of the combustor, the exit valve being rotationally driven to close the outlet of the combustor when filled with fuel and air and during combustion, and to open the outlet during exhaust.

It is desirable that the afore-mentioned supply valve and afore-mentioned exit valve be of the cylindrical rotary type, and it is more desirable that the afore-mentioned cylindrical rotary supply valve and the afore-mentioned cylindrical rotary exit valve are integrally connected by a central shaft so that the supply valve and exit valve may be operated rapidly and with precise timing by a simple structure where they are rotated together.

An intake to receive air is provided upstream of the afore-mentioned combustor, and by supplying the high-pressure air ram-compressed in the inlet to the combustor as oxidizer, a pulse detonation engine integrating a ramjet engine and a pulse detonation engine can be obtained. By cooling the high-pressure air ram-compressed in the afore-mentioned inlet in an air cooler (heat exchanger), the density of the air can be increased, and by closing the exit valve of the combustor during the process of filling with the gaseous mixture, transition to the detonation process is possible without expansion of the high-pressure high density air.

The valve for the pulse detonation engine of the present invention resolving the afore-mentioned problems is A valve for a pulse detonation engine for detonating a gaseous mixture of an oxidizer and a fuel in a combustor to obtain output, wherein the valve is constituted by a cylindrical rotary supply valve which is formed in a tubular structure, of which the end on the oxidizer intake side is open, and the other end is closed; a plurality of supply holes are provided symmetrically relative to the central axis in part of the tube surface; and the cylindrical rotary supply valve is arranged in the combustor inlet so as to be rotationally driven. Furthermore, by combining the afore-mentioned cylindrical rotary supply valve with the cylindrical rotary exit valve positioned in the combustor exit so as to be able to be rotated, a pulse detonation engine valve can be obtained wherein the cylindrical rotary supply valve has superior rapid opening and closing performance and improved proof against fatigue break in relation to vibration and repetitive stress due to combustion, while increasing pressure and density in the process of filling the combustor with the gaseous mixture, and permitting high thrust density in supersonic air-breathing engines at high altitude. The afore-mentioned cylindrical rotary exit valve is formed in a tubular structure wherein one end is closed and the other end is open, and a plurality of supply holes are provided symmetrically relative to the central axis in part of the tube surface.

BRIEF DESCRIPTION OF THE DRAWINGS

FIGS. 3A and 3B show perspective views of the cylindrical rotary valve according to an embodiment of the present invention;

FIGS. 4A through 4C show schematic representations of each operation of filling, combustion and exhaust in the pulse detonation engine of the present invention;

FIGS. 5A through 5C show schematic representations of each operation of filling, combustion and exhaust in a conventional pulse detonation engine;

FIG. 6 is a graph showing the difference in specific impulse between the cases wherein an exit valve is provided and not provided in the pulse detonation ramjet engine of the present embodiment;

DESCRIPTION OF THE PREFERRED EMBODIMENTS

The pulse detonation engine of the present invention provides an intermittently opening and closing valve in the open end of the combustor outlet referred to as an "exit valve". In addition to a large flow of combustion gas at high pressure and high temperature passing through this exit valve, it is also required to rapidly open and close, and conventional butterfly solenoid valves and mushroom valves therefore cannot be employed. A cylindrical rotary valve has been invented for the present invention to achieve the necessary function and durability. It is able to handle large flows of operating fluid at high pressure and high temperature in a pulse detonation engine, and employs a valve mechanism for rapid operation.

Figure 1:
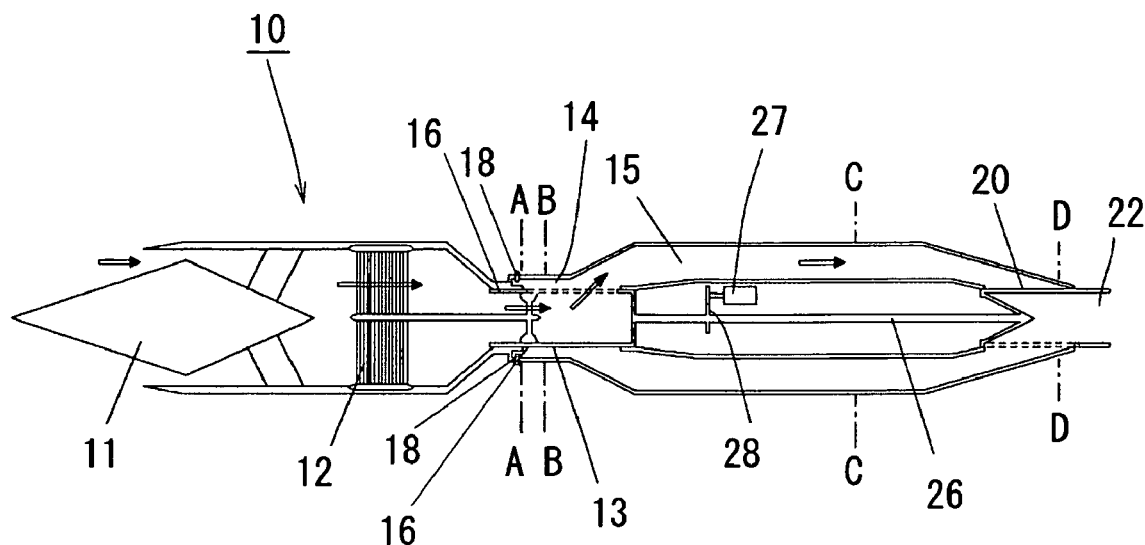
FIG. 1 shows a schematic cross-sectional representation of the pulse detonation ramjet engine according to an embodiment of the present invention.

An embodiment of the present invention will be described below. FIG. 1 is a schematic cross-section drawing of the pulse detonation engine according to an embodiment of the present invention.

Figure 2A:
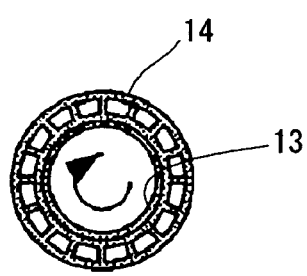
FIGS. 2A through 2D show cross-sections along A-A, B-B, C-C, and D-D respectively in FIG. 1.
Figure 2B:
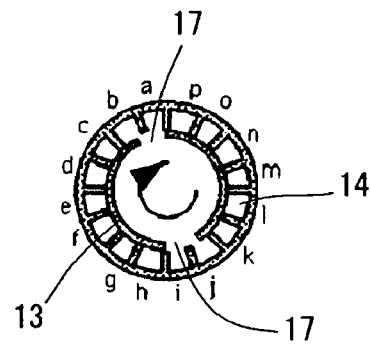
Figure 2C:
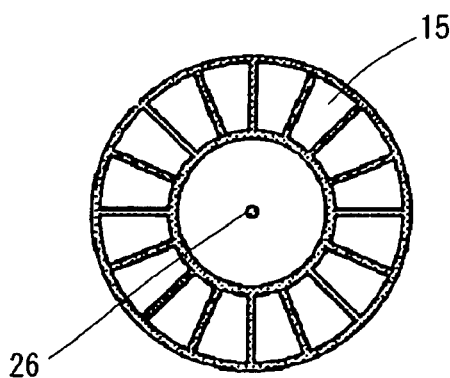

The pulse detonation engine 10 of the present embodiment is a pulse detonation ramjet engine integrating a pulse detonation engine employing pulse detonation as the primary combustion process with a ramjet engine, and comprises primarily an intake 11 receiving ram-compressed air, an air cooler 12, a precombustor 14, a fuel injector 16, an igniter 18, a supply valve 13, a combustor 15, an exit valve 20, and a nozzle 22. In the pulse detonation engine 10 of the present embodiment, ram-compressed air received at the intake 11 is cooled by heat-exchange with a cryogenic coolant and increased in density, and supplied to the combustor (combustion tube) 15 via the supply valve 13. It is desirable that liquid hydrogen fuel be employed as the coolant of the air cooler 12. As a result, the fuel is heated in the air cooler 12, and subsequently supplied to the combustor 15 via the fuel injector 16 and supply valve 13. A plurality of combustors 15 are positioned axially on the circumference (sixteen combustors shown in FIG. 2A through 2D in the present embodiment), combustion start timing differing for each combustor 15. The sixteen combustors are labeled sequentially "a" through "p" (in FIG. 2B).

As shown in FIGS. 3A and 3B, the supply valve 13 is of tubular shape with the end on the inlet side closed and the other end open, and a plurality of supply holes 17 (two holes spaced at 180° in the embodiment in the figure) are provided in the tube surface such that the gaseous mixture flows into the precombustor 14 and combustors 15 only when the phases of the supply holes in the supply valve and the holes in the combustors match. In the condition shown in section in FIG. 2B, air and fuel (air and fuel are referred to as a "gaseous mixture") are supplied to the combustors a, b, i, and j facing the supply hole 17. At this time, the combustors c, d, k, and l previously filled with the gaseous mixture are ignited with the igniter 18 from the closed end 19 of the precombustor 14, and combustion occurs with the detonation wave. Initial combustion immediately after ignited forms a deflagration wave, however since the diameter of the precombustor 14 is less than the combustor 15, the transition from deflagration to detonation is readily achieved, and a stable detonation wave is propagated in the combustor.

Figure 2D:
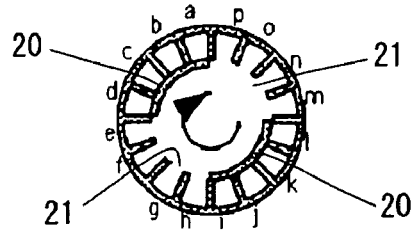

The exit valve 20 is provided at the outlet of the combustors 15, and a plurality of outlet holes 21 (two holes in the example shown) are provided in the tube surface at positions at which the phase differs from the supply valve 13 such that the exit valve 20 is closed when the gaseous mixture is supplied to the combustors. Thus, the supply pressure of the gaseous mixture may be equalized with the outlet pressure of the intake. As shown in FIG. 2D, at the time the detonation wave reaches the exit valve, the outlet holes 21 in the exit valves 20 rotate to overlap with the combustor outlet, and the detonation wave reaches the exterior of the engine (combustors e, f, m, and n) via the exit valve 20 and the nozzle 22. After the detonation wave reaches the nozzle outlet, the high-pressure combustion gas is exhausted (combustors g, h, o, and p) to atmosphere via the nozzle 22 generating thrust. In the present engine, the supply valve and exit valve rotate rapidly, and supply, combustion, and exhaust are repeated at a frequency of between 10 Hz and 100 Hz to match the phase of rotation. Since satisfactory thrust is not generated if the timing of opening and closing of the supply valve and the exit valve is disturbed, the supply valve and exit valve are connected by a central shaft 26 and rotated by an electric motor or fuel turbine as described below. FIG. 4A through 4C are schematic drawings showing the opening and closing of the exit valve 20 of the combustor 15 in each of the afore-mentioned processes of filling, combustion, and exhaust, with the exit valve 20 closed during the filling and combustion processes, and open during the exhaust process.

FIGS. 3A and 3B is perspective views of the cylindrical rotary valve 25 according to an embodiment of the present invention wherein the supply valve 13 and the exit valve 20 are integrally configured by connection via a central shaft 26. As shown in FIG. 1, the central shafts 26 are connected with an appropriate driving actuator 27 such as a motor and the like via a transmission mechanism 28, and rotated with the prescribed timing. According to the cylindrical rotary valve 25 of the present embodiment, the supply valve 13 and exit valve 20 are therefore always rotated in the same phase relationship. Realization of the pulse detonation engine requires that the timing of supply, ignition, and exhaust for each combustor be maintained in the same phase without disturbance, however by mechanically connecting the supply valve and exit valve, it is possible to prevent disturbance of the phases of the cylindrical rotary valve of the present invention, and to always maintain the same phase in operation. Furthermore, by controlling the ignition timing of the igniter with the position signal of the drive mechanism, disturbance of the ignition timing is reduced.

Since the vicinity of the supply valve 13 and the exit valve 20 are periodically subject to high temperature and high pressure due to detonation, there is the possibility of deterioration in strength and brake due to metal fatigue and thermal fatigue, and a robust structure is required. The cylindrical rotary valve of the present invention ensures that the processes of supply, combustion, and exhaust always occur at phases differing by 180°, and by ensuring that high-pressure air acts on the outside of the valve, suppresses metal fatigue and thermal fatigue. In other words, the pressure due to combustion always acts in the direction of the central axis of the tube, and by constantly generating an equal force in the opposite phase, cancels out the force acting on the entire valve. Thus, it is possible to improve reliability of the supply valve and exit valve, reduce the valve drive force, and reduce the size and weight of the drive mechanism. Furthermore, the life of the bearing mechanism supporting the valve and shaft can be increased and its size reduced.

A preferred embodiment of the present invention has been described above, however the present invention is not limited to the afore-mentioned embodiment. The afore-mentioned embodiment represents the case of a pulse detonation ramjet engine integrating a ramjet engine and pulse detonation engine, however it is not limited to integration with a ramjet engine, and may be combined with a turbojet engine and the like.

First Embodiment

Figure 7:
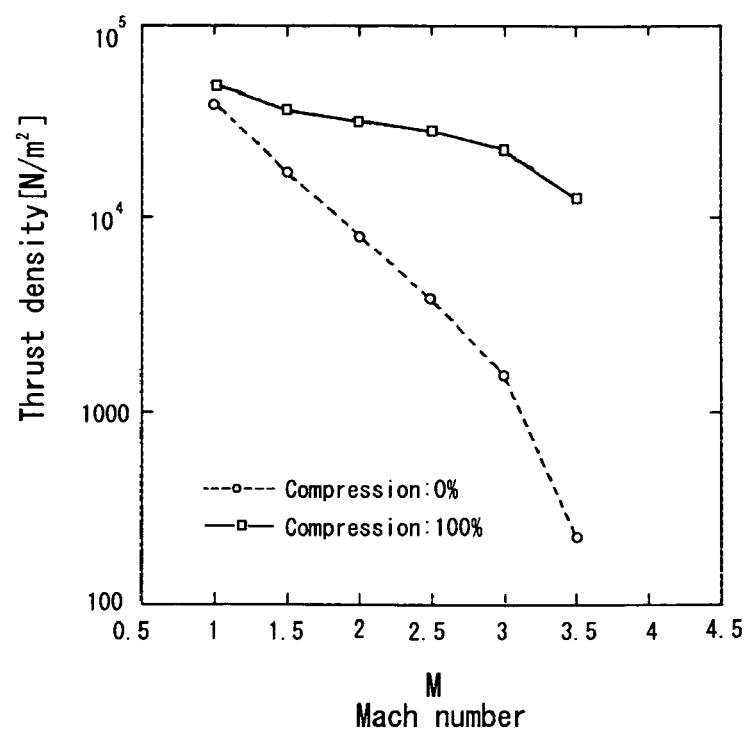
FIG. 7 is a graph showing the difference in thrust density between the afore-mentioned two cases.

In order to verify the effect of providing an exit valve in the pulse detonation ramjet engine of the afore-mentioned embodiment, specific impulse and thrust density at Mach 1 through 3 was analyzed by simulation of the case of the combustor outlet closed with the exit valve when the gaseous mixture is supplied (compression ratio 100%), and the case of a similar combustor outlet in a conventional pulse detonation engine opened to atmosphere (compression ratio 0%). Results are shown in FIG. 6 and FIG. 7. Since airflow was the maximum at Mach 4 that can react into combustion in the combustor by the simulation, the inlet diameter was determined for Mach 4, and the inlet flow capture ratio reduced at below Mach 4. The results of the simulation showed that, when detonation occurred at an inlet maximum total pressure of 100% (in other words, with the combustor exit valve 20 closed and the combustor filled with gaseous mixture), an increase of approximately 700 seconds was apparent in specific impulse at Mach 3 as shown in FIG. 6, thus verifying the effects of the present invention of increasing the combustor supply pressure. Similarly, an increase in thrust density at Mach 3 in excess of $10^4 N/m^2$ was apparent as shown in FIG. 7.

Second Embodiment

Figure 8:
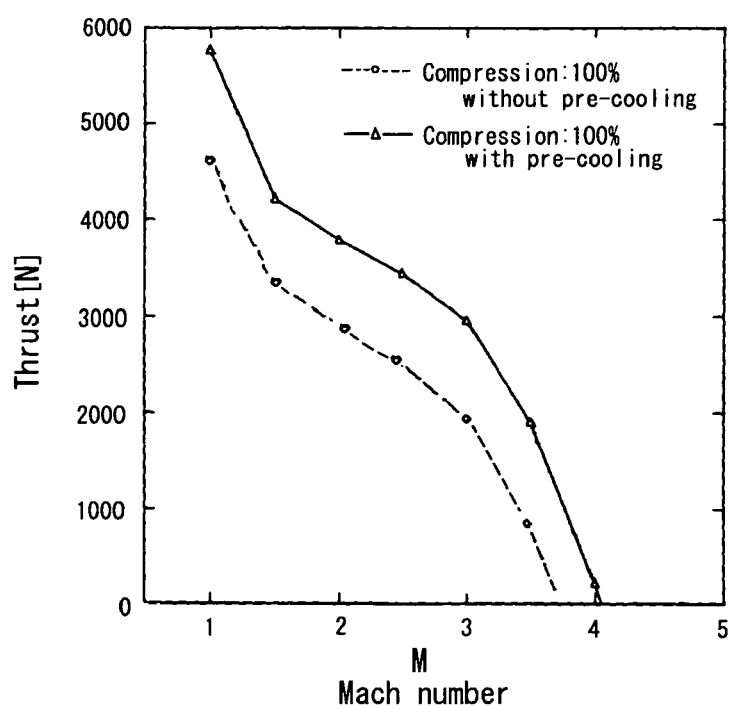
FIG. 8 is a graph showing the difference in thrust due to pre-cooling in the pulse detonation ramjet engine of the present embodiment.

Furthermore, in order to verify the cooling effect when a heat exchanger is provided in the outlet of the intake in the pulse detonation ramjet engine of the afore-mentioned embodiment, with the high-pressure air cooled by heat-exchange with liquid hydrogen being a coolant, change in thrust was analyzed by simulation of the cases of employing and not employing cooling in the first embodiment. Results are shown in FIG. 8. As shown in FIG. 8, a large increase in thrust at all Mach numbers was apparent when cooling was employed in comparison to the case of cooling not being employed. Furthermore, combustor inlet temperature at Mach 4 was reduced by approximately 200 K, and the flight envelope was able to be extended by approximately Mach 0.5 in comparison with the case of cooling not being employed.

According to the pulse detonation engine of the present invention, since pressure and density can be increased in the gaseous mixture supply process, and engine thrust density may be increased, operation of an air-breathing pulse detonation engine at high altitude and high-speed is possible. Furthermore, by increasing the density of the gas mixture, it is possible to use a pulse detonation engine having a rocket engine in space. In all engines employing pulse detonation as the primary combustion process, pressure and density in the gaseous mixture supply process can be increased, and engine thrust density may be increased.

A dramatic improvement is possible in thrust performance of thrust engines able to be applied in spaceplanes, high-speed aircraft, and launch rockets and the like, and payload can be increased. Furthermore, the cycle pressure ratio and temperature ratio are increased, and thermal efficiency is improved.

INDUSTRIAL APPLICABILITY

By providing a valve in the combustor outlet, the thrust performance of the pulse detonation engine of the present invention in high-speed flight is improved, and effective operation up to approximately Mach 4 is possible. Furthermore, by cooling the air received at the inlet, the flight envelope can be extended by approximately Mach 0.5, and it is possible to use the engine not only for conventional low-speed aircraft, but also as a propulsion engine for spaceplanes, high-speed aircraft, and launch rockets and the like. By employing a cylindrical rotary configuration in the valve of the pulse detonation engine of the present embodiment, superior rapid opening and closing performance and relief of metal fatigue and thermal fatigue are obtained, and reduction in size and weight, and increased life, of the drive mechanism are possible, while at the same time the outlet of the combustor can open and close rapidly, and the pressure with which the gaseous mixture is supplied to the combustor can be increased. The valve can therefore be applied to pulse detonation engines of a variety with utilities and types.

What is claimed is:

1. A pulse detonation engine for detonating a gaseous mixture of an oxidizer and a fuel in a combustor to obtain thrust, comprising:
    a supply valve able to open and close provided in the inlet of said combustor; and
    an exit valve able to open and close provided in the outlet of said combustor,
    wherein said supply valve is rotationally driven to open the inlet of said combustor and said exit valve is rotationally driven to close the outlet while said gaseous mixture is supplied to the combustor; and
    wherein said exit valve is rotationally driven to close the outlet of said combustor and said supply valve is rotationally driven to close the inlet while said gaseous mixture is ignited and a combustion occurs with a detonation wave propagated in the combustor; and
    wherein said exit valve is rotationally driven to open the outlet of said combustor and said supply valve is rotationally driven to close the inlet when said detonation wave of said combustion reaches the outlet of the combustor.

2. A pulse detonation engine disclosed in claim 1 wherein said supply valve comprises a cylindrical rotary supply valve which is formed in a tubular structure, of which one end adjacent to an oxidizer intake has opening, and the other end is closed; and
    a plurality of supply holes are provided symmetrically relative to a central axis in part of the tube side surface; and
    said cylindrical rotary supply valve is arranged in said combustor inlet so as to be rotationally driven.

3. A pulse detonation engine disclosed in claim 1 or 2 wherein said supply valve is a cylindrical rotary supply valve; and
    wherein said exit valve comprises a cylindrical rotary exit valve which is formed in a tubular structure, of which one end facing the supply valve is closed, and the other end is open; and
    a plurality of exit holes are provided symmetrically relative to a central axis in part of the tube side surface; and
    said cylindrical rotary exit valve is arranged in said combustor outlet so as to be rotationally driven; and
    said cylindrical rotary supply valve and said cylindrical rotary exit valve are connected by a central shaft and rotationally driven together.

4. A pulse detonation engine disclosed in claim 3 comprising an intake to introduce air upstream of said combustor, wherein
    said oxidizer is compressed air obtained by ram-compression; and
    said pulse detonation engine is a pulse detonation ramjet engine in which a ramjet engine is integrated with a pulse detonation engine.

5. A pulse detonation engine disclosed in claim 4 comprising a heat exchanger in the outlet of said intake to cool ram-compressed air.

6. A pulse detonation engine disclosed in claim 5 wherein a coolant for said heat exchanger is liquid hydrogen employed as fuel.

* * * * *

UNITED STATES PATENT AND TRADEMARK OFFICE
CERTIFICATE OF CORRECTION

PATENT NO. : 7,251,928 B2
APPLICATION NO. : 11/061546
DATED : February 18, 2005
INVENTOR(S) : Takayuki Kojima et al.

It is certified that error appears in the above-identified patent and that said Letters Patent is hereby corrected as shown below:

On The Title Page
In item (73) the Assignee change "Japanese Aerospace Exploration" to be --Japan Aerospace Exploration--.

Signed and Sealed this

Fourth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,251,928 B2  Page 1 of 1
APPLICATION NO. : 11/061546
DATED : August 7, 2007
INVENTOR(S) : Takayuki Kojima et al.

It is certified that error appears in the above-identified patent and that said Letters Patent is hereby corrected as shown below:

<u>On The Title Page</u>
In item (73) the Assignee change "Japanese Aerospace Exploration" to be --Japan Aerospace Exploration--.

This certificate supersedes Certificate of Correction issued December 4, 2007.

Signed and Sealed this

Twenty-fifth Day of December, 2007

JON W. DUDAS
*Director of the United States Patent and Trademark Office*